United States Patent
Pinnow et al.

[15] 3,691,482
[45] Sept. 12, 1972

[54] DISPLAY SYSTEM

[72] Inventors: Douglas Arthur Pinnow, Berkeley Heights; Le Grand Gerard Van Uitert, Morris Township, Morris County, both of N.J.

[73] Assignee: Bell Telephone Laboratories, Incorporated, Murray Hill, Berkeley Heights, N.J.

[22] Filed: Jan. 19, 1970

[21] Appl. No.: 3,636

[52] U.S. Cl. ............... 332/7.51, 250/199, 330/108, 330/334
[51] Int. Cl. ....................................... H01s 3/10
[58] Field of Search ......... 302/7.51; 250/71, 80, 199; 330/334, 108; 252/301.4; 331/94.5

[56] References Cited

UNITED STATES PATENTS

| 3,524,011 | 8/1970 | Korpel | 178/5.4 |
| 3,322,682 | 5/1967 | Thompson | 252/301.4 |
| 3,488,503 | 1/1970 | Reich et al. | 250/199 |
| 3,572,941 | 3/1971 | Kiss | 350/150 |
| 3,495,034 | 2/1970 | Arend et al. | 350/160 P |
| 3,541,542 | 11/1970 | Dugway et al. | 340/324 |
| 3,453,604 | 7/1969 | Geusic et al. | 330/4.3 |

FOREIGN PATENTS OR APPLICATIONS

| 1,564,271 | 4/1969 | France | 252/301.4 |

OTHER PUBLICATIONS

C. E. Baker, Laser Display Technology, 12/68, pp. 39–50, IEEE Spactrum.
Oliver, " Sparkling Spots and Random Diffraction," Proc. IEEE, Vol. 51, pp. 220–221, 1/63
Carsidive, " Effects of Coherence or Imaging Systems" J. Opt. Soc. Am. Vol. 56, pp. 1001–1009, 8/66

Primary Examiner—Benjamin A. Borchelt
Assistant Examiner—N. Moskowitz
Attorney—R. J. Guenther and Edwin B. Cave

[57] ABSTRACT

A single color display is produced by projection using a scanning laser beam operating in the visible or ultraviolet and a photoluminescent screen which emits in the visible. Combinations of phosphors may be employed to simulate white or desired colors.

9 Claims, 3 Drawing Figures

3,691,482

DISPLAY SYSTEM

BACKGROUND OF THE INVENTION

1. Field of the Invention

The invention is concerned with projection display systems and is primarily concerned with those producing black and white images by coherent lighting.

2. Description of the Prior Art

Interest in laser display systems is based on the premise of screens of essentially unlimited size. Many of the elements necessary for such systems are presently available. High intensity lasers operating at a variety of frequencies within the visible spectrum have been demonstrated as have modulation and scanning techniques of sufficient capacity for most projection applications.

One popular approach, production of images by direct reflection of visible laser emission, is subject to two drawbacks. First, images are monochromatic of a particular well-defined wavelength so that images produced by use of an argon-ion laser, for example, may be blue and black; and, second, reflection of coherent laser output produces a speckled image due to periodic reinforcement of the scattered beam. See Volume 46, *Bell System Technical Journal*, page 1479, September 1967.

In copending U. S. Pat. application Ser. No. 827,644, filed May 26, 1969, there is described a laser display system which produces images essentially free from speckle problems. That system relies on a phosphor screen, the functional portion of which is cerium doped YAG (yttrium aluminum garnet). The phosphor, when excited by a laser beam of appropriate wavelength, emits a broad band of yellowish coloration which, in a preferred embodiment, combines with reflected laser light to produce an apparent black and white image. This system has been demonstrated and appears appropriate for commercial exploitation.

SUMMARY OF THE INVENTION

It has now been determined that a practical single color laser display system alternative to that described above may utilize a range of phosphor compositions which are, at least in part, organic. As in the copending application, the system depends upon use of laser energy at one or more wavelengths, at least one of which emits in the visible or ultraviolet spectra at a somewhat shorter wavelength than a major portion of the phosphor emission.

Due to the large variation of organic phosphor materials which are suitable for use, few limitations are placed on the nature of the energizing laser. Suitable lasers include argon-ion emitting at 4,880 A. and cadmium-ion emitting at 4,416 A. The range of suitable exciting wavelengths for useable monochromatic displays is from about 2,500 A. to about 5,500 A.

Specific wavelengths within this broad range are chosen in accordance with the phosphor characteristics. Suitable phosphors are discussed at some length in the Detailed Description. Generally speaking, suitable materials are organic dyes or pigments many of which are commercially available and in widespread use.

In this description, use will be made of the term "-colorant" or "organic colorant." It is to be understood that this term includes photoluminescent organic dyes and pigments. Pigments are particularly useful and may be formed by dissolving a dye in an organic resin solution which is subsequently condensed. It is known that luminescent efficiency in certain cases may be enhanced if the dye is absorbed on a colloid which may take the form of gell fibers or particles of high molecular weight polymers.

As in the YAG-cerium phosphor display, absorptions in the phosphor are generally broadband and the emission peak is relatively insensitive to a shift in energizing wavelength. This phenomenon is quite useful since it may permit substitution of laser sources without marked change in apparent emission color.

The invention is broadly premised on the use of such organic colorants. Monochromatic displays result from use of homogeneous phosphor screens. These may be present as self-supporting members or as coatings, and they may be made up on one or any combination of colorants required to produce the desired balance. Similarly, the amount of reflected laser radiation may be varied by deliberate inclusion of "inert" ingredients in the phosphor. So, for example, a filler such as talc results in an increase in ratio of reflected to converted energy.

DETAILED DESCRIPTION

1. Drawing

Figure 1:
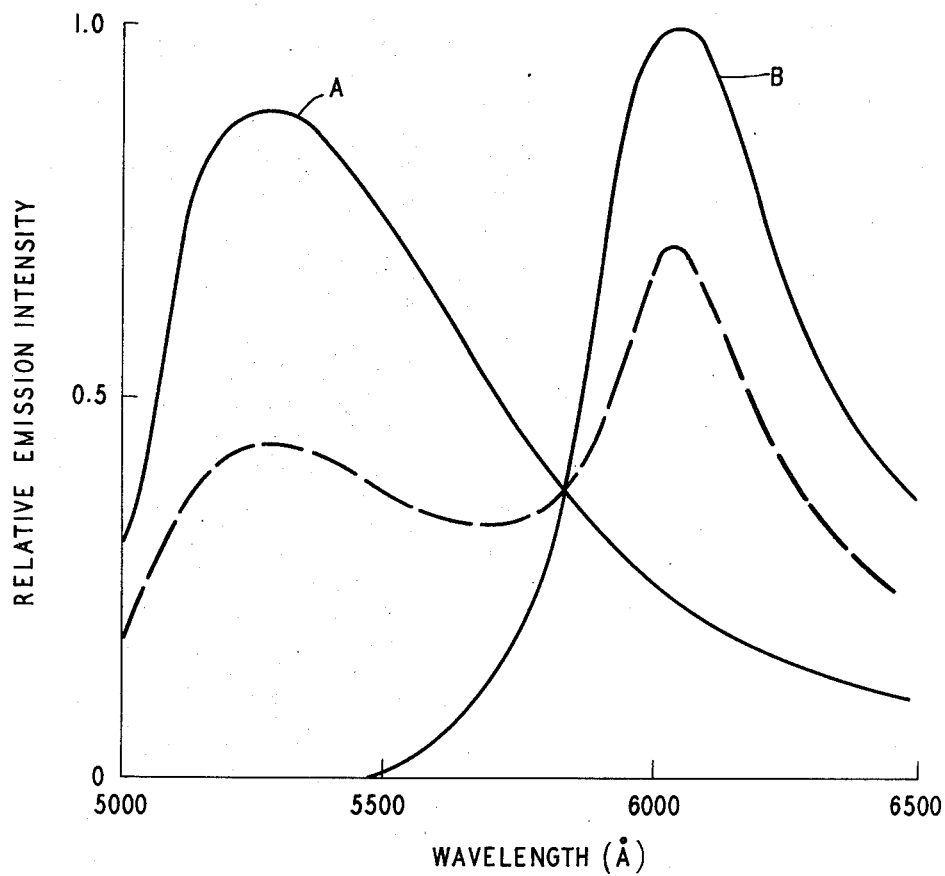
FIG. 1, on coordinates of intensity in arbitrary units and wavelengths in angstroms, is a plot of the emission for illustrative colorants under 4,880 A. excitation.

Referring again to FIG. 1, the data presented are the emission spectra for two organic phosphors and their 50–50 blend. The types are 4-amino, 1,8-napthal p-xenylimide (peaking at 5,300 A.) (curve A) and Rhodamine (peaking at 6,050 A.) (curve B). Both fluoresce with high efficiencies (greater than 50 percent) under 4,880 A. excitation. The broken line represents a particulate 50–50 mixture of these two phosphors. The individual phosphors fluoresce yellow-green and red. Their combined output is orange. The blue content of radiation from the screen can also be enhanced by addition of reflective matter to increase the fraction of 4,880 A. laser radiation reflected when this argon-ion laser radiation is use, for example. Hence, the overall effect is to produce a whiter appearance to the eye.

Figure 2:
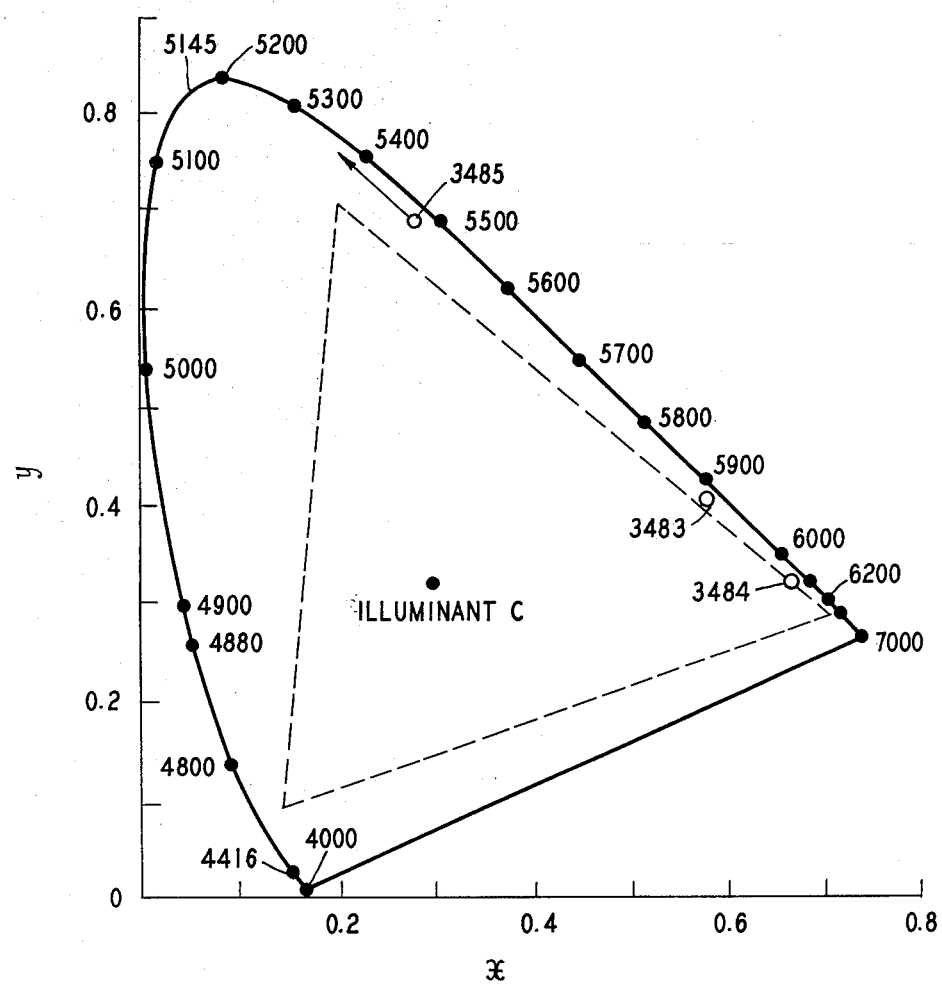
FIG. 2 is a chromaticity diagram showing the coordinates of several particularly useful phosphor emissions.

FIG. 2 is the internationally accepted CIE chromaticity diagram (see *Applied Optics: A Guide to Modern Optical System Design* (J. Wiley & Sons 1968) Ch. 1 by L. Levi) which can be used as a guide in assessing the color quality of a display system. In this diagram, the saturated (monochromatic) colors are located on the perimeter of the horseshoe-shaped plot, while colors of decreasing saturation approach illuminant C which is a white color equivalent to average daylight illumination. Every real color, regardless of its spectral complexity, can be represented by a single point on or within this plot. A straight line connecting any two points (primaries) represents the locus of possible colors that can be achieved by blending them in varying proportions. Similarly, the gamut of colors possible by the combination of more than two primaries are those which fall within the polygon determined by straight lines which connect adjacent primaries. As an example, the dotted triangle in FIG. 1 encloses the color gamut of a shadow mask color CRT. For comparison, there is also shown the major cadmium and argon laser lines at 4,416 A., 4,880 A., and 5,145 A. as well as the emissions of the YAG:Ce phosphor and of the three organic dyes (related to 4-amino, 1,8-napthal p-xenylimide); and phosphors (3485, 3483 and 3484 which are Rhodomine based pigments). The arrow on the 3485 dye emission shows the effect of adding phthalocyanine toner, which selectively absorbs the longer wavelength yellow and red portion of the emission to produce a more vivid green. It can be seen that the combination of light from either of these blue laser sources and emission from the 3,483 A. and 3,485 A. phosphors results in a color gamut similar to that of the color cathode ray tube.

A black and white display can be achieved by scanning a monochromatic laser beam on a viewing screen that is coated with an appropriate blend of phosphors and direct scattering materials such as powdered MgO or talc. For example, a combination of scattered light from a blue argon-ion laser beam (4,880 A.) and blue-to-red converted light from either of the Rhodamine dye phosphors can produce a white appearance since a straight line connecting these primaries on the chromaticity diagram passes very near to illuminant C.

A combination of more than two primaries can also be used to produce white. As an example, a Cd-He laser beam which illuminates a correctly proportioned mixture of MgO and dye phosphors 3,484 A. and 3,485 A. can be used to achieve a white appearance. Alternately, MgO may be replaced by pyrelene-containing materials or 7-diethyl amino, 4-methyl coumarin-containing materials (blue-to-blue and ultraviolet-to-blue converting phosphor, respectively, to completely eliminate speckle).

Regardless of how many phosphors are used, it is apparent from the chromaticity diagram that a necessary condition for achieving a true white is that the illuminating laser beam have a wavelength of approximately 4,950 A. or shorter. Otherwise, it is impossible to include illuminant C within a polygon whose primaries are the source and any combination of longer wavelengths that can be achieved by down-conversion of frequency. Fortunately, the argon-ion laser satisfies this necessary condition.

Figure 3:
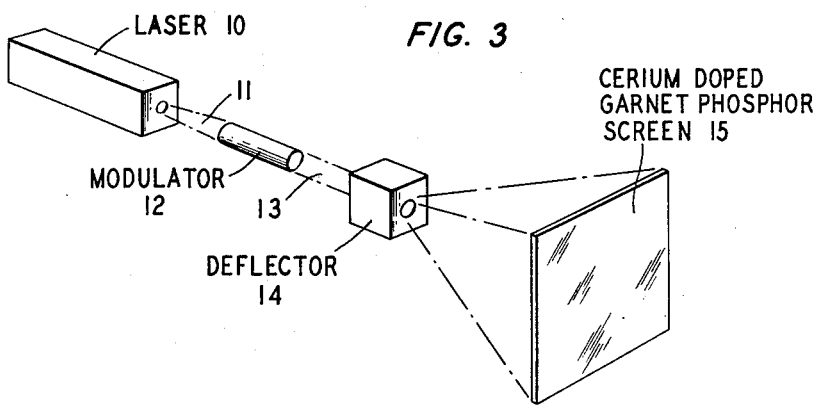
FIG. 3 is a perspective view of a system in accordance with the invention.

FIG. 3 is a perspective view of a simple system in accordance with the invention. Energizing light is produced by laser 10 which may, for example, be an argon-ion laser or a cadmium-ion laser. The emerging beam 11 first enters modulator 12 which is provided with a modulating signal by means, not shown, for amplitude modulating the beam. Modulation may be accomplished, for example, by electro-optic, acousto-optic, or magneto-optic techniques.

A description of suitable acousto-optic devices is contained in Vol. 46, *Bell System Technical Journal*, p. 367, February 1967. A description of suitable electro-optic devices is described in Vol. 38, *Journal of Applied Physics*, pp. 1611–1617, March 1967. In any event, modulation may be accomplished by altering the total amount of light of a particular polarization sense which is passed by an analyzer incorporated in the modulator, or alternatively by controlling the amount of light which is deflected acoustooptically.

Upon emerging from modulator 12, the beam, now denoted 13, enters deflector 14 which produces the appropriate horizontal and vertical deflection so as to fill screen 15. Deflector 14 may advantageously operate on an acousto-optic principle, see, for example, Vol. 57, *Proceedings of the IEEE*, p. 160, February 1969. The deflector 14 may also perform the modulation function eliminating the need for a separate modulator 12. Earlier deflector systems utilize mechanical, sometimes motor driven, scanners.

Inventive novelty is premised largely on the nature of phosphor screen 15 as incorporated in the overall system. Laser display systems of the general nature of that of FIG. 2 are described in some detail in the existing scientific literature. See, for example, *IEEE Spectrum* for December 1968, at page 39, et seq.

The chemical nature of this screen is described in some detail in the section which follows.

2. Composition

The inventive system depends upon a phosphor screen containing at least one fluorescent organic dye or pigment. Representative materials and the color which they fluoresce include pyrelene (blue); fluorescein (yellow-green); eosin (yellow); Rhodamine-B (red); Rhodamine-6G (yellow); acridine (blue); acriflavin (yellow-green); napthalene red (red); auromine-O (yellow-green); 4-amino, 1,8-napthal p-xenylimide (yellow-green) and 7-diethylamino, 4-methyl coumarin (blue). Other dyes are xanthene, azine, oxazine, thiazine, acridine, flavin, napthalimide and coumarin derivatives. Data on absorption and emission of selected dyes is given in Table I. Such data may be used to optimize screen composition for a give laser source.

TABLE I.—ABSORPTION AND FLUORESCENCE BANDS OF DYES IN AQUEOUS OR ALCOHOLIC SOLUTIONS (Approximate limits of bands in A.; peaks of bands in parentheses)

| Compounds | First absorption band | Fluorescence Band | Color |
|---|---|---|---|
| I. Xanthene: | | | |
| Fluoran | U.V. | 2,900–4,600 (3,200) | Violet, strong. |
| Fluorescein (dihydroxyfluoran). | 4,400–5,200 (4,940) | 5,100–5,900 (5,180) | Yellow-green, very strong. |
| Eosin (tetrabromofluorescein). | 4,500–5,600 (5,170) | 5,200–6,000 (5,400) | Yellow, strong. |
| Erythrosin (tetraiodofluorescein). | 4,600–5,560 (5,165) | 5,180–5,880 (5,375) | Yellow, weak. |
| Rose bengale (tetraiodotetrachlorofluorescein). | (5,438) | 5,500–6,700 (6,000) | Orange, very weak. |

TABLE I.—ABSORPTION AND FLUORESCENCE BANDS OF DYES IN AQUEOUS OR ALCOHOLIC SOLUTIONS—Continued (Approximate limits of bands in A.; peaks of bands in parentheses)

| Compounds | First absorption band | Fluorescence Band | Color |
|---|---|---|---|
| Rhodamine B extra | 4,800–6,000 (5,500) | 5,500–7,000 (6,050) | Red, strong. |
| Rhodamine 6 G | 4,800–5,900 (5,260) | 5,360–6,020 (5,550) | Yellow, strong. |
| Acridine red | 4,550–6,000 | 5,600–6,800 | Orange medium. |
| Pyronine B | 5,400–5,900 | 5,600–6,500 | Do. |
| II. Acridine: | | | |
| Acridine | 3,000–4,500 | 4,000–4,800 | Blue-violet, medium. |
| Acridine yellow | U.V.–5,200 | 4,750–6,400 | Green. |
| Euchrysine | U.V.–5,400 | 5,050–6,700 (5,850) | Greenish yellow, medium. |
| Rheonine A | U.V.–5,100 | 4,700–6,500 | Green, weak. |
| Acriflavine (trypaflavine) | U.V.–5,000 | 4,850–6,600 | Yellowish-green, strong. |
| III. Azine: | | | |
| Magdala red | 4,000–6,000 (5,240) | 5,500–7,000 (6,000) | Red, strong. |
| Safranine | (5,390) | | Yellow-red. |
| IV. Thiazine: | | | |
| Thionine | 4,800–6,300 (5,800) | | Orange, medium. |
| Methylene blue | 5,500–7,000 | | Red, medium. |

A napthalimide dye; 4-amino, 1,8-napthal p-xenylimide (yellow-green) and two Rhodamine dyes (orange and red) are exemplary. Their emission spectra for 4,880 A. excitation exhibit peaks at 5,300 A. (yellow-green), 6,050 A. (orange-red) and 6,200 A (red), respectively. It has been determined that their lifetimes are all considerably less than 1 microsecond and their absorption cross sections are so large that the entire laser beam is absorbed within the thin films which are approximately 0.1 mm thick. Their absorption bands are quite broad, including essentially all of the violet and blue and a portion of the green. It has been estimated that their quantum efficiencies are above 50 percent. Thus, these materials are well suited for laser display systems.

The colors of these fluorescing dyes may be modified somewhat by varying the type of carrier which is used to form pigments, and to a lesser extent by varying the type of vehicle, or binder, into which the pigment is incorporated. It is also possible to modify colors by combining fluorescent dyes with nonfluorescent dyes that selectively absorb a portion of the emission spectrum. For example, the emission spectrum of the naphthalimide dye (type 3485) shown in FIG. 1 peaks at 5,300 A. in the green. Normally this fluorescence appears to have a yellowish-green cast due to the broad tail of the emission spectrum which extends into the yellow and red. However, this tail can be substantially reduced by the addition of a nonfluorescing green toner such as phthalocyanine which absorbs in the yellow and red. The result then is a tradeoff of brightness for the ability to limit the spectral content.

In contrast to the many yellow and red emitting dyes, blue emitting dyes are less common. However, examination of pyrelene in dilute alcoholic solutions indicates that it is blue-fluorescing when excited by short wavelength blue light such as the 4,579 A. emission of an argon laser or the 4,416 A. emission of a cadmium laser, while it becomes green fluorescing under longer wavelength blue excitation such as the 4,880 A. line of an argon laser. In addition, pigments of coumarin which fluoresce blue under near ultraviolet excitation are commercially available.

3. Design Criteria

While occasions may arise in which it is desired to produce colored or off-white images, the more significant aspect of the invention is concerned with white or near-white images. In the system using an argon or cadmium laser, white images may result by adjustment of the screen composition to a yellow cast so that reflected blue adds in to give a whiter image.

However, suitable choices of phosphors can readily be made so that no compensation is needed. This may be accomplished, for example, by blending particulate mixtures of blue, yellow and red emitting phosphors. Under such circumstances, the phosphor layer is designed so as to result in little or no reflection. This may be accomplished by providing for essentially complete absorption and minimal reflection.

It is apparent that final design of a phosphor screen depends upon power levels, laser wavelength, phosphor absorption level, and emission wavelength. Reflection of unconverted laser emission may be enhanced by using thin coatings, by reflective backings (although this also results in additional secondary emission during retraversal) and by incorporation of "inert" reflective material such as talc.

In the main, inventive novelty is premised on phosphor composition and the chromaticity balance achieved between the laser wavelength and the emission wavelength. Display systems have been discussed in terms of one exemplary arrangement. Variations may utilize a laser source which is behind rather than in front of a screen and a variety of other arrangements for folding beams, for modulation, for deflection, etc.

What is claimed is:

1. Visual display apparatus comprising a laser for emitting at a wavelength in the visible spectrum, first means for amplitude modulating the output of such laser, second means for deflecting said beam, and a screen, characterized in that said screen comprises a layer of a phosphorescent composition consisting essentially of at least one organic colorant, in which apparatus the said laser emits at a wavelength between 0.3 and 0.53$\mu$ and the said phosphorescent composition appears to the eye to fluoresce essentially white, it being a characteristic of such apparatus that a visual display resulting from use is essentially free from speckle.

2. Apparatus of clam 1 in which the said phosphorescent composition and screen design are such that a portion of the laser emission is unconverted so that the combination of reflected laser emission and the phosphor emission from the screen appears approximately white.

3. Apparatus of claim 1 in which the laser is an argon-ion laser.

4. Apparatus of claim 1 in which the laser is a cadmium-ion laser.

5. Apparatus of claim 1 in which the phosphor composition contains at least one fluorescent organic component selected from the group consisting of coumarin, xanthene, acridine, Rhodamine naphthalimide, azine, thiazine, type compounds.

6. Apparatus of claim 5 in which the said component is selected from the group consisting of pyrelene, 7-diethylamino 4-methyl coumarin, Rhodamine B, Rhodamine 6G, acridine, 4-amino 1,8-naphthal p-xenylimide.

7. Apparatus of claim 1 in which the said first means is an electro-optic modulator and in which the said second means is an acousto-optic deflector.

8. Apparatus of claim 1 in which the said first and second means depend upon an acousto-optic interaction.

9. Apparatus of claim 7 in which the said first and second means constitute a single unit.

* * * * *